US008317470B2

(12) United States Patent
Villella

(10) Patent No.: US 8,317,470 B2
(45) Date of Patent: Nov. 27, 2012

(54) COMBINED LIGHT FITTING AND CEILING FAN

(75) Inventor: Joe Villella, Mill Park (AU)

(73) Assignee: Fanaway Technology Hong Kong Ltd. (CN)

( * ) Notice: Subject to any disclaimer, the term of this patent is extended or adjusted under 35 U.S.C. 154(b) by 1323 days.

(21) Appl. No.: 11/995,585

(22) PCT Filed: Jul. 13, 2006

(86) PCT No.: PCT/AU2006/000981

§ 371 (c)(1), (2), (4) Date: Jan. 14, 2008

(87) PCT Pub. No.: WO2007/006096

PCT Pub. Date: Jan. 18, 2007

(65) Prior Publication Data

US 2008/0226449 A1 Sep. 18, 2008

(30) Foreign Application Priority Data

Jul. 13, 2005 (AU) ................................ 2005903707

(51) Int. Cl.
*B64C 11/28* (2006.01)

(52) U.S. Cl. ............................. 416/5; 416/143; 416/140

(58) Field of Classification Search ................ 415/5, 87, 415/131, 135, 136, 137, 142, 143; 416/5, 416/87, 131, 135, 136, 137, 142, 143, 140
See application file for complete search history.

(56) References Cited

U.S. PATENT DOCUMENTS

| | | | | |
|---|---|---|---|---|
| 1,361,785 | A | 12/1920 | Tucker | |
| 1,445,402 | A | 2/1923 | Le Velle | |
| 1,458,348 | A | 6/1923 | Le Velle | |
| 2,079,942 | A * | 5/1937 | Le Velle | 416/87 |
| 2,296,682 | A * | 9/1942 | Millar | 416/243 |
| 2,352,186 | A * | 6/1944 | Corrigan | 416/133 |
| 3,692,427 | A * | 9/1972 | Risse | 416/143 |
| 4,139,330 | A * | 2/1979 | Neal | 416/87 |
| 4,776,761 | A | 10/1988 | Diaz | |
| 5,743,489 | A * | 4/1998 | Stemme | 244/62 |
| 6,213,716 | B1 | 4/2001 | Bucher et al. | |
| 6,666,652 | B2 | 12/2003 | Bucher et al. | |
| 6,719,533 | B2 | 4/2004 | Bird | |
| 7,153,100 | B2 * | 12/2006 | Frampton et al. | 416/5 |
| 7,625,186 | B1 * | 12/2009 | Lueddecke | 416/243 |

* cited by examiner

*Primary Examiner* — Edward Look
*Assistant Examiner* — Ryan Ellis
(74) *Attorney, Agent, or Firm* — Brooks Kushman P.C.

(57) ABSTRACT

A combined ceiling fan and light fitting (fan/light) (1) having folding fan blades (12) is provided. The fan light (1) has a blade support (13) arranged to be rotated by an electric motor (6), with blades (12) being secured to the blade support (13), a root end of each blade (12) being pivotable between folded and operative positions about a blade pivot axis-(14) fixed in the blade support (13). In one aspect of the invention, an improved mechanism is provided for synchronizing movement of the blades. This uses a sun gear (16) mounted to the blade support and arranged to mesh with planet gears (17) that rotate about the blade pivot axes (14). In addition improvements are provided to blades (12, 33, 60) and blade mounting arrangements that balance compact folding of the blades (12, 33, 60) and good air moving effectiveness.

13 Claims, 11 Drawing Sheets

COMBINED LIGHT FITTING AND CEILING FAN

TECHNICAL FIELD

The invention described herein relates to a combined light fitting and ceiling fan having blades that are compactly folded when the fan is not in use and that move outwardly when the fan is started

BACKGROUND ART

Ceiling fans have long been recognized and used as an inexpensive way to provide movement of air within rooms of buildings. They are simple to use and install, safe, and inexpensive when compared to such alternatives as for example refrigerated and evaporative air conditioning units. They can often provide a surprisingly effective alternative to air conditioning as the air movement they generate can evaporate skin perspiration with a resulting cooling effect.

It is known to combine ceiling fans with lighting means, as firstly it is a common requirement to provide ceiling mounted light sources, and secondly it is convenient to provide a single power supply to operate a combined fan and light fitting.

It has also been known to provide ceiling fans with some form of folding or retracting blade arrangement. This has been done to improve the appearance of the fan when it is not operative, to avoid the collection of dust on the blades and ease cleaning of the blades.

There have also been very few examples of combined ceiling fan and light fittings with retracting blades. Le Velle has described three versions. U.S. Pat. No. 1,445,402 discloses a light fitting and ceiling fan in which blades move outwards under centrifugal force when the fan is switched on, and are retracted by springs when the fan is switched off. U.S. Pat. Nos. 1,458,348 and 2,079,942 disclose improved versions, in which (unlike the early version of U.S. Pat. No. 1,445,402) the inward and outward movements of the blades are synchronized. Synchronizing blade movement is important for preserving satisfactory balance of the rotating parts of the fan. A ceiling fan that is poorly balanced may tend to come away from its mounting to the ceiling (potentially presenting a danger), may be noisier than a properly balanced fan and is generally unsightly.

References in this specification to certain patents are not intended as or to be taken as an admission that anything therein forms a part of the common general knowledge in the art.

Combined ceiling fans and light fittings with retractable blades have failed to become popular despite offering the advantages of both combining lighting means and a fan and of providing retractable blades.

The retraction mechanism described by Le Velle In U.S. Pat. No. 1,458,348 appears to be difficult to set up to keep all blades in good synchronization, and may also have been difficult to keep in that condition, for example if the wires used to connect the blades stretched.

The different mechanism described in U.S. Pat. No. 2,079,942 has links that extend from each blade to a rotatable "synchronizing ring", and is simple in principle. However, the parts count is quite high and the assembly is believed to be labour-intensive and to require some skill. Further, the parts do not lend themselves well to cheap modern production materials and methods. Moreover, reasonably accurate synchronization of the blades when they are partly extended appears difficult to achieve due to the effect of clearances between the links and the holes accommodating them in the blades and synchronizing ring. As ceiling fans tend to come up to operating speed and come to a stop quite slowly in practice, this it is believed can lead to periods of significant unbalance.

A further disadvantage of the arrangement of U.S. Pat. No. 2,079,942 is that the synchronizing mechanism including the synchronizing ring has to lie substantially above the fan motor, due to the mechanism geometry, so that achieving a compact design is difficult, especially if it is desired to use a fan motor of modern casing design.

It is an object of the present invention to at least alleviate the above disadvantages. A further object is to provide a combined ceiling fan and light fitting with enhanced performance, including in respect of air moving performance.

SUMMARY OF THE INVENTION

According to the invention, there is provided in a first aspect, a combined ceiling fan and light fitting having folding fan blades comprising:

a blade support means arranged to be rotated by an electric motor;

a plurality of fan blades secured to the blade support means; a root end of each blade being pivotable between folded and operative positions about a blade pivot axis fixed in the blade support means;

associated with each blade a planet gear arranged to rotate with that blade; and a sun gear mounted to the blade support means coaxially with the electric motor and rotatable relative to the blade support means, wherein each planet gear is arranged to mesh with the planet gear so that the blades are pivotable about their respective pivot axes in synchronization with each other.

Preferably, the combined ceiling fan and light fitting further comprises resilient means arranged to bias the fan blades into their folded positions the fan blades being arranged to be unfolded by centrifugal force when the electric motor is operative.

It is further preferred that in their folded positions the fan blades lie at least in part above the blade support means and the sun and planet gears lie below the blade support means. This better conceals the gears and limits accumulation of dust on the gears.

The blade support means may be secured to a rotatable casing of the electric motor. This arrangement is convenient where the motor is of the type having a rotating casing.

The combined ceiling fan and light fitting further comprises light generating means, preferably supported by non-rotating means passing through the electric motor casing.

Preferably, said light fitting means is mounted within an enclosure of which at least a part is translucent the enclosure being supported by the non-rotating means passing through the electric motor casing.

For minimal visual impact of the blades when in their folded positions, it is preferred that in their folded positions the fan blades when seen from above lie substantially within a peripheral boundary of the said enclosure.

The fan blades may be cambered along their lengths.

The fan blades may also be formed to have a variable angle of incidence to the horizontal when in their working positions. Preferably, the angle of incidence is less at the tips of the blades than at the blades' root ends.

In one embodiment, tip ends of the blades in their operating positions rotate in a plane closer to a ceiling from which the combined ceiling fan and light fitting is suspended than root ends of said blades. That is the blades may have "dihedral" in the sense defined herein, when in their extended positions.

The pivot axes of the blades may be oriented other than parallel to the rotation axis of the electric motor. This is not to preclude the pivot axes being oriented parallel to the rotation axis of the electric motor, however.

The pivot axes may be closer to the motor rotation axis immediately above the blades than immediately below the blades.

In another aspect of the invention, there is provided a combined ceiling fan and light fitting having folding fan blades, comprising:

a blade support means arranged to be rotated by an electric motor; and a plurality of fan blades secured to the blade support means, a root end of each blade being pivotable between folded and operative positions about a blade pivot axis fixed in the blade support means, wherein tip ends of said blades in their operating positions rotate in a plane closer to a ceiling from which the combined ceiling fan and light fitting than root ends of said blades.

In this aspect, the combined ceiling fan and light fitting may further comprise:

associated with each blade a planet gear arranged to rotate with that blade; and a sun gear mounted to the blade support means coaxially with a rotation axis of the electric motor and rotatable relative to the blade support means, wherein each planet gear is arranged to mesh with the planet gear so that the blades are pivotable about their respective pivot axes in synchronization with each other.

Also in this aspect of the invention, the pivot axes of the blades may be oriented other than parallel to the rotation axis of the electric motor.

In still another aspect of the invention, there is provided a combined ceiling fan and light fitting having folding fan blades comprising:

a blade support means arranged to be rotated by an electric motor; and a plurality of fan blades secured to the blade support means, a root end of each blade being pivotable between folded and operative positions about a blade pivot axis fixed in the blade support means, wherein when seen from above each blade between the root end and a tip end has a blade width that firstly increases with increasing distance along the blade away from the root end and then decreases towards the tip end.

Other preferred and/or additional features of the invention of the invention are disclosed in the following detailed description.

In order that the invention may be better understood there will now be described, non-limitingly, preferred embodiments of the invention as shown in the attached Figures, of which:

Figure 8:
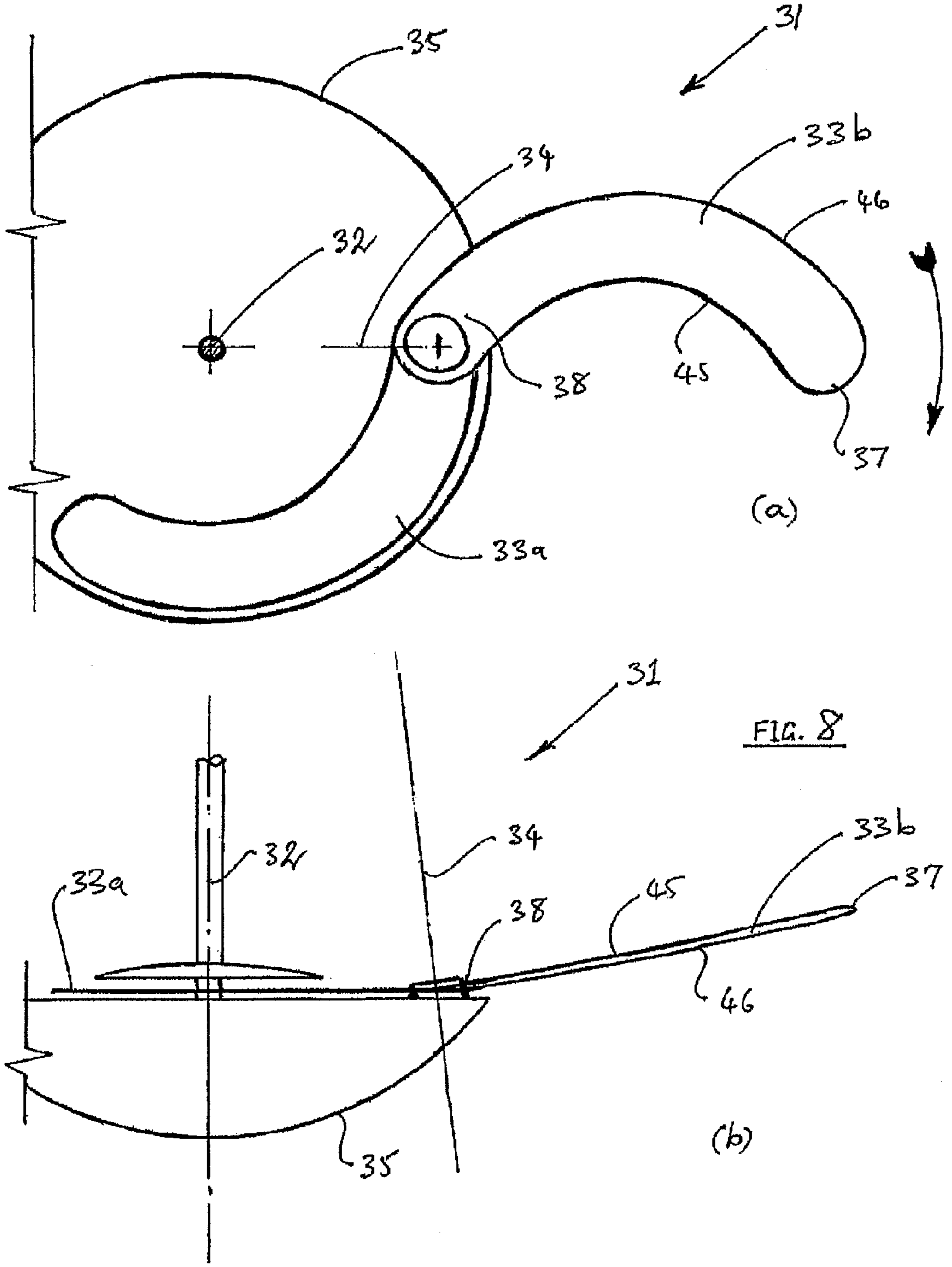
Figure 9:
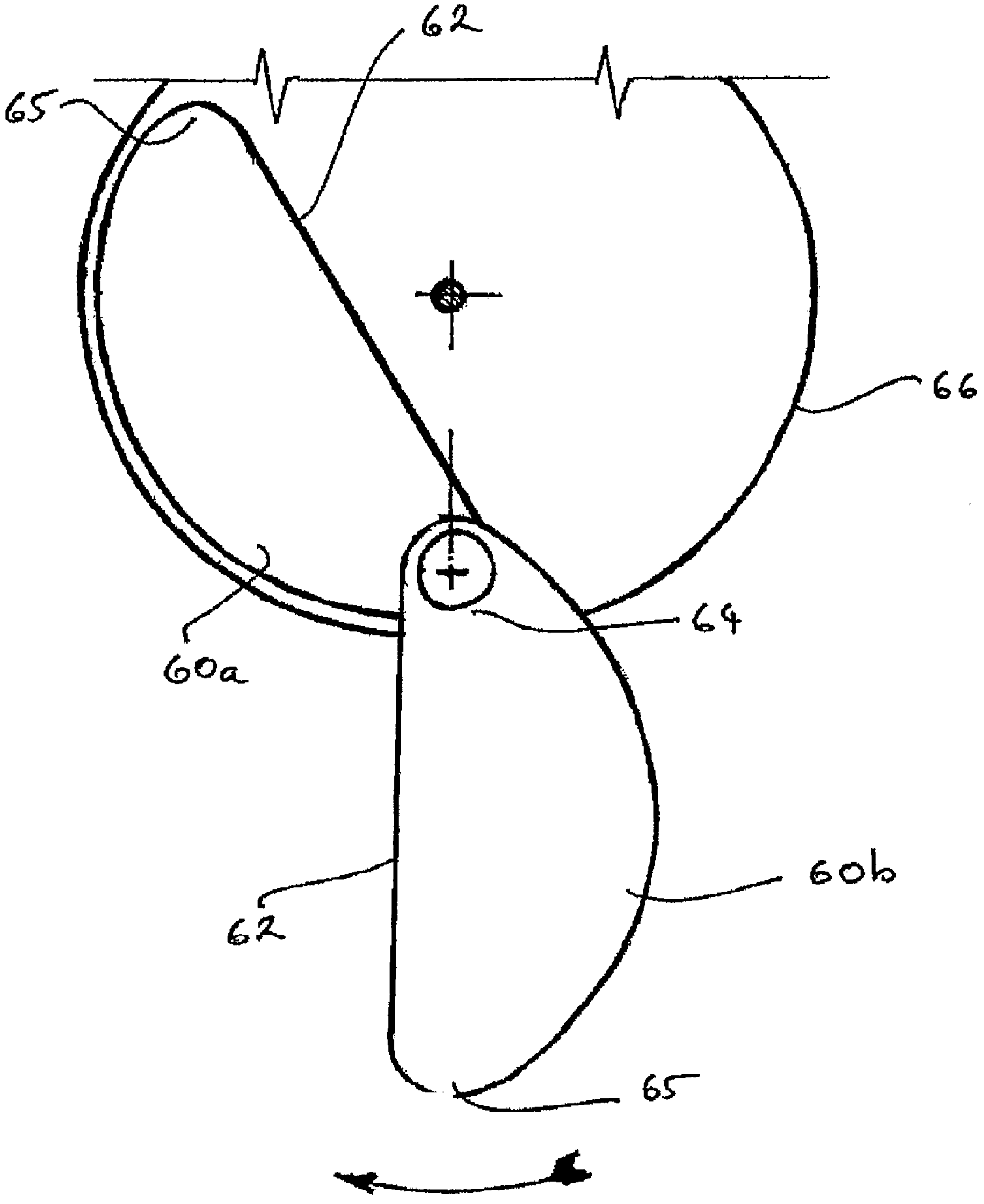
Figure 10:
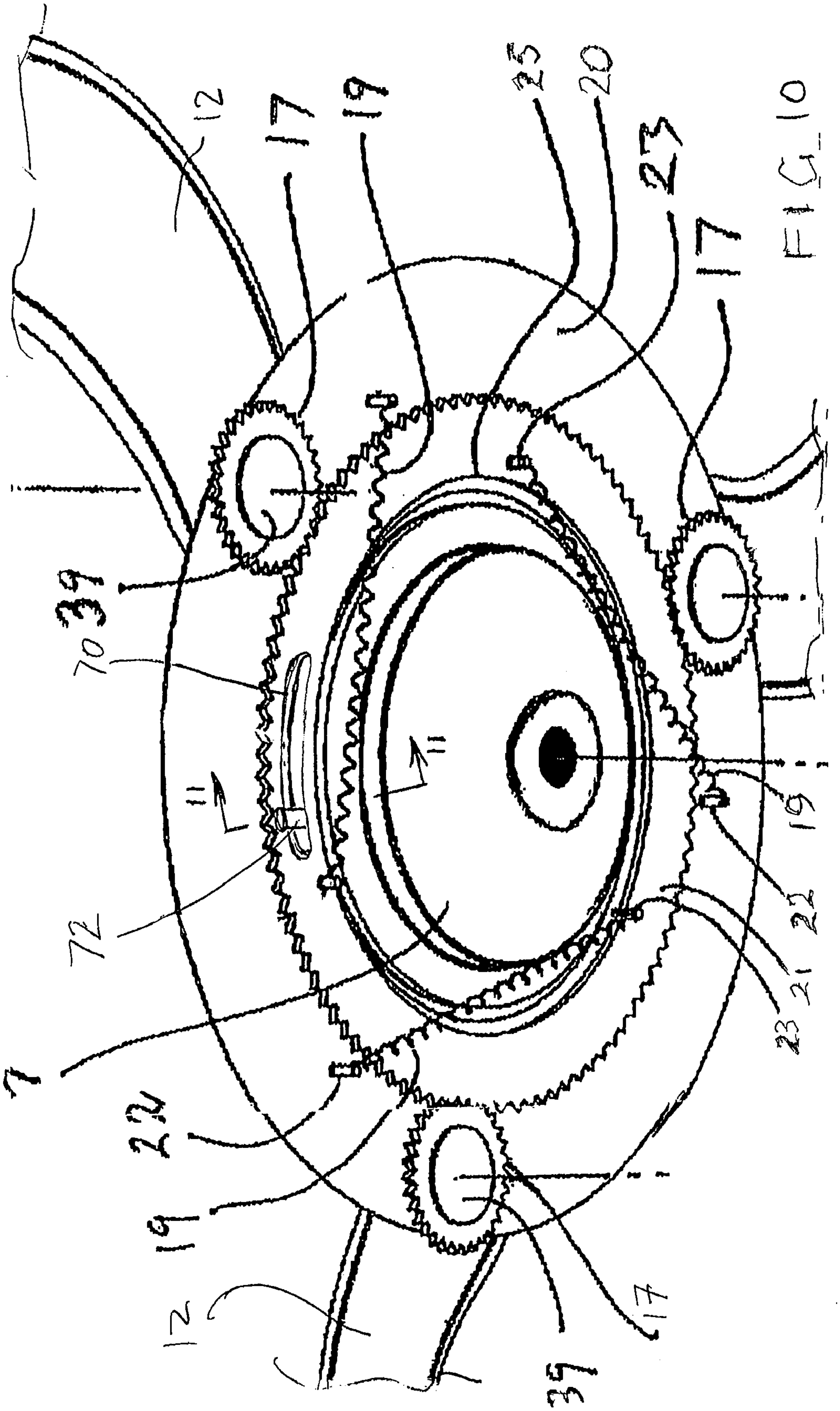
Figure 11:
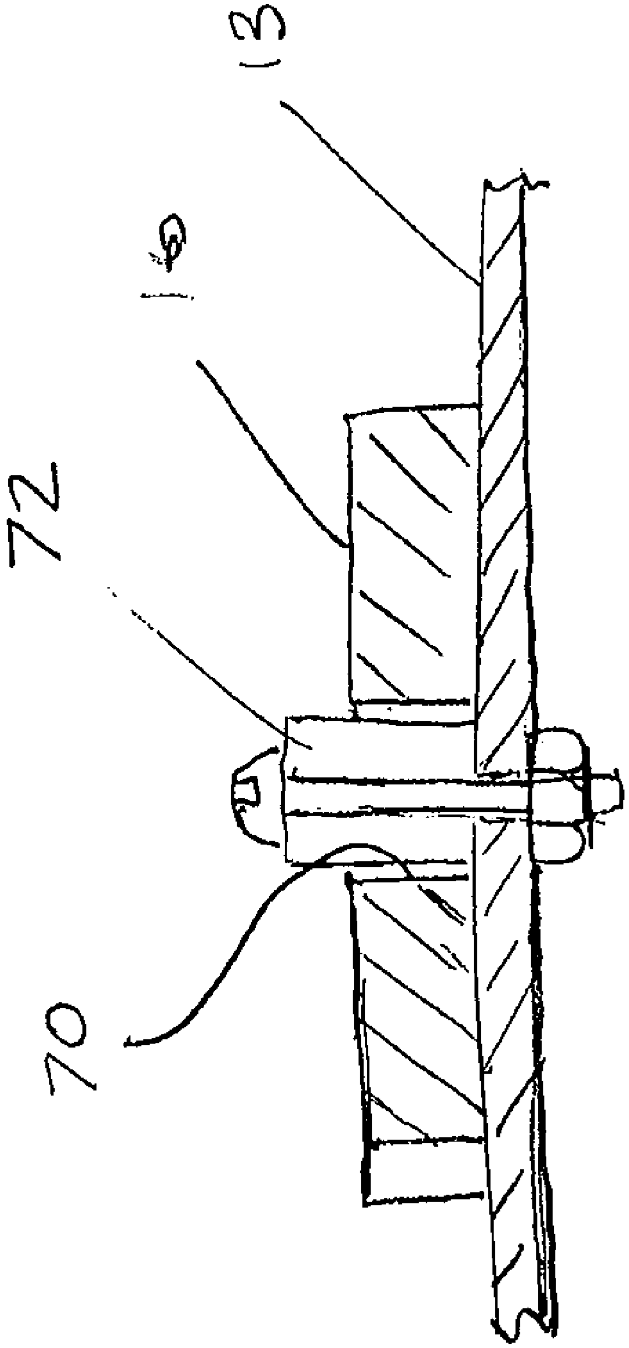

FIG. 8 comprises at (a) a partial and schematic plan view and at (b) a partial and schematic side elevation of a further embodiment of a combined ceiling fan and light fitting according to the invention;

FIG. 9 shows a partial and schematic plan view of a further embodiment of a combined ceiling fan and light fitting according to the invention;

FIG. 10 is a fragmentary view of the combined ceiling fan and light fitting; and FIG. 11 is a schematic radial cross-sectional view along the line 11-11, shown on FIG. 10.

DETAILED DESCRIPTION OF PREFERRED EMBODIMENTS

Figure 1:
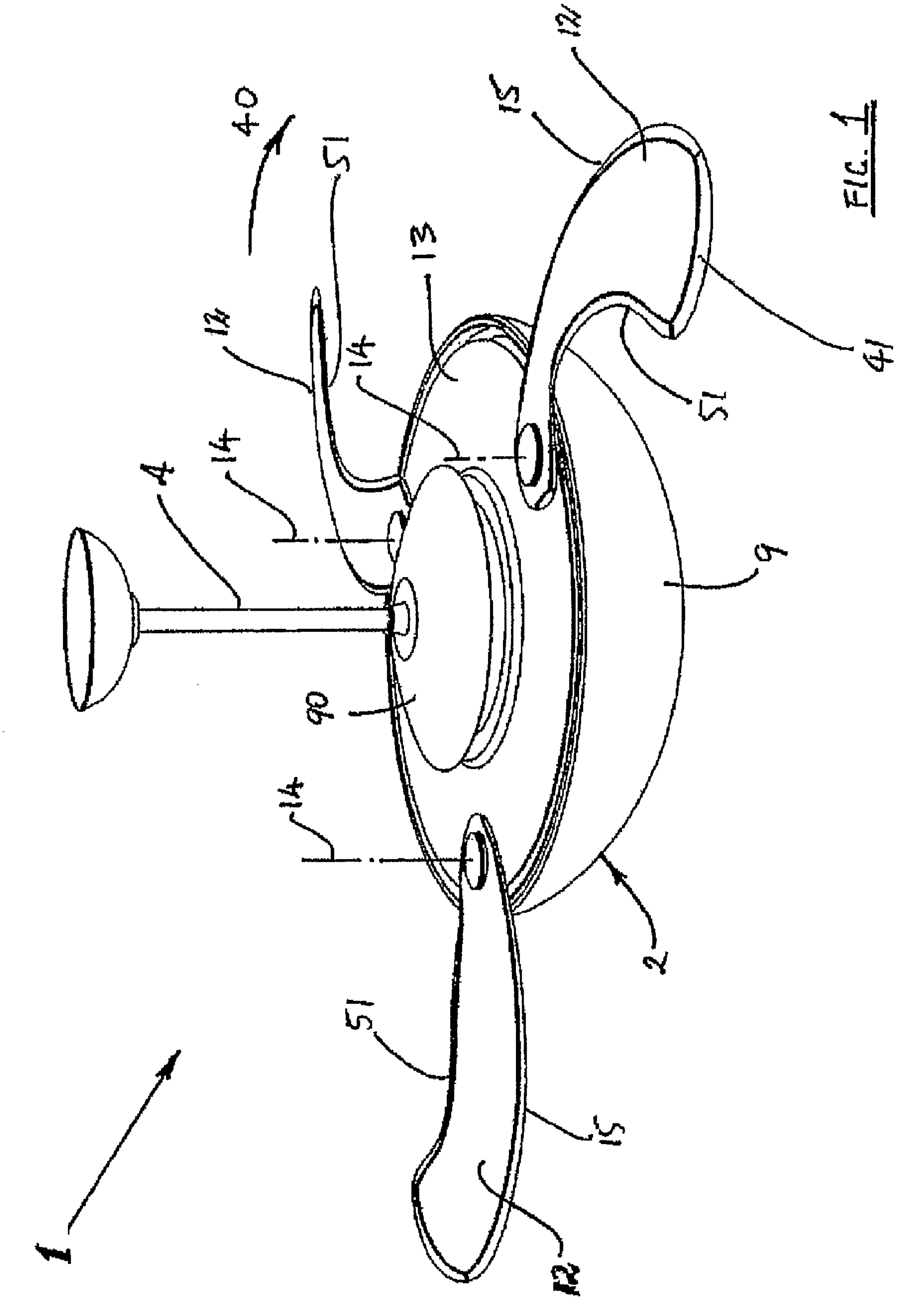
FIG. 1 is a perspective view of a combined ceiling fan and light fitting according to the invention, with its folding blades in working positions.

FIG. 1 shows a combined ceiling fan and light fitting 1 according to the invention. A combined ceiling fan and light fitting will herein be referred to as a fan/light for convenience and brevity. Fan/light 1 has a bowl-shaped enclosure 2 in which is mounted at least one electric lamp 3, and is supported from a ceiling by a tubular support 4 in known manner. Fan/light 1 also has fan blades 12 that are rotatable by an electric motor 6. The electric motor 6 and the lamp 3 are operable separately or together from a source of electric power that is supplied through the tubular support 4. Motor 6 is of the known type, widely used in ceiling fans, that has a rotating casing 7 with a central cavity in which is received the tubular support. An extension 8 of tubular support 4 protrudes below casing 7 and supports non-rotating enclosure 2.

Enclosure 2 includes a translucent bowl-shaped lower section 9 that in use is retained under an upper cover 10 by clips (not shown) arranged around the periphery of cover 10. Lower section 9 is removable (by uncapping) from cover 10 so that lamp 3 can be changed when necessary. Cover 10 is circular in plan view, as is lower section 9, and has a conically-shaped central depression 11 in which is received with clearance the lower part of motor casing 7.

An upper cover 90 is provided on the support 4 above the folded positions of the blades 12, to further enhance appearance and to limit dust movement into the mechanism of the fan/light 1.

Figure 2:
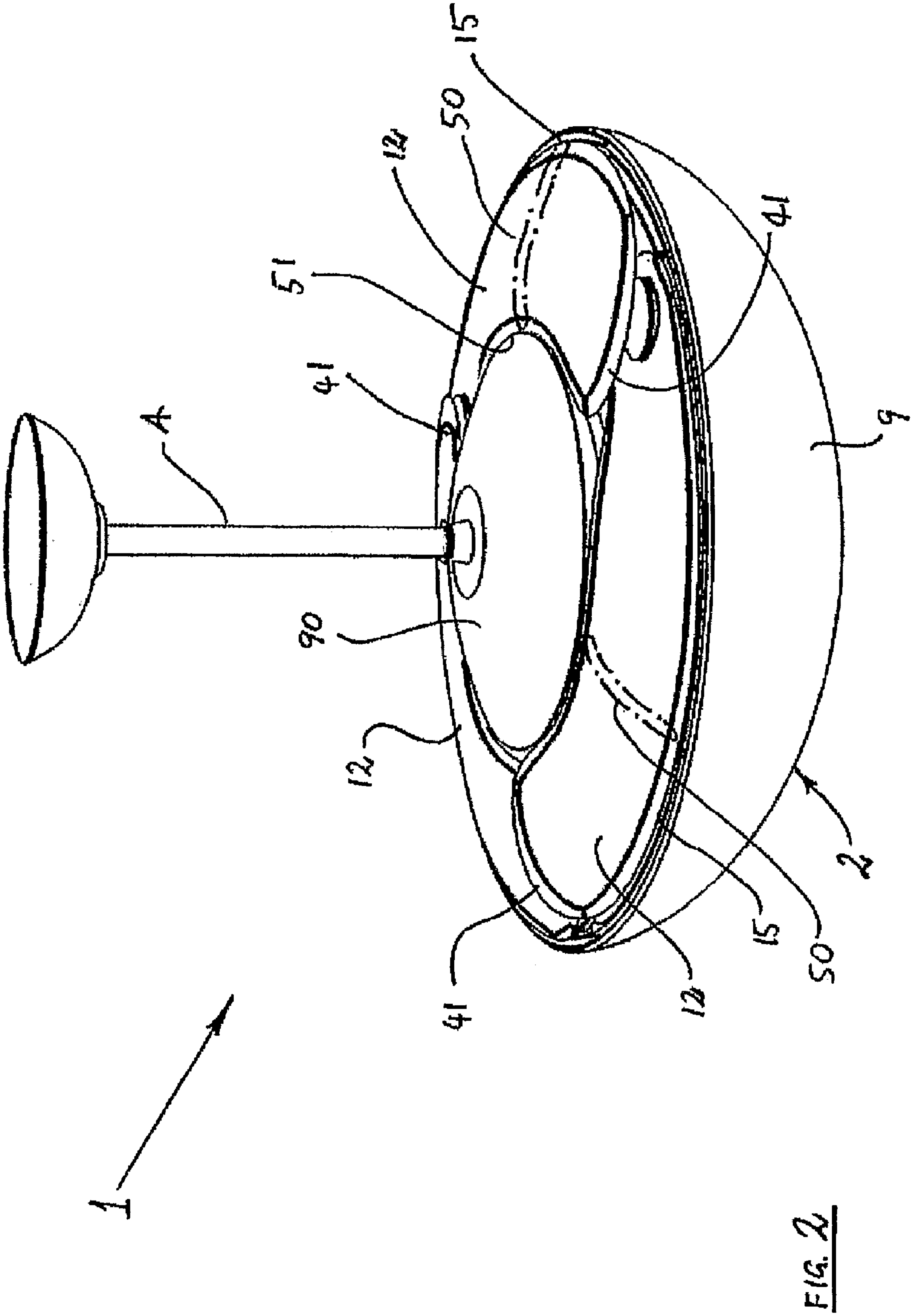
FIG. 2 is a perspective view of the combined ceiling fan and light fitting shown in FIG. 1, now with its folding blades in a stored position.
Figure 3:
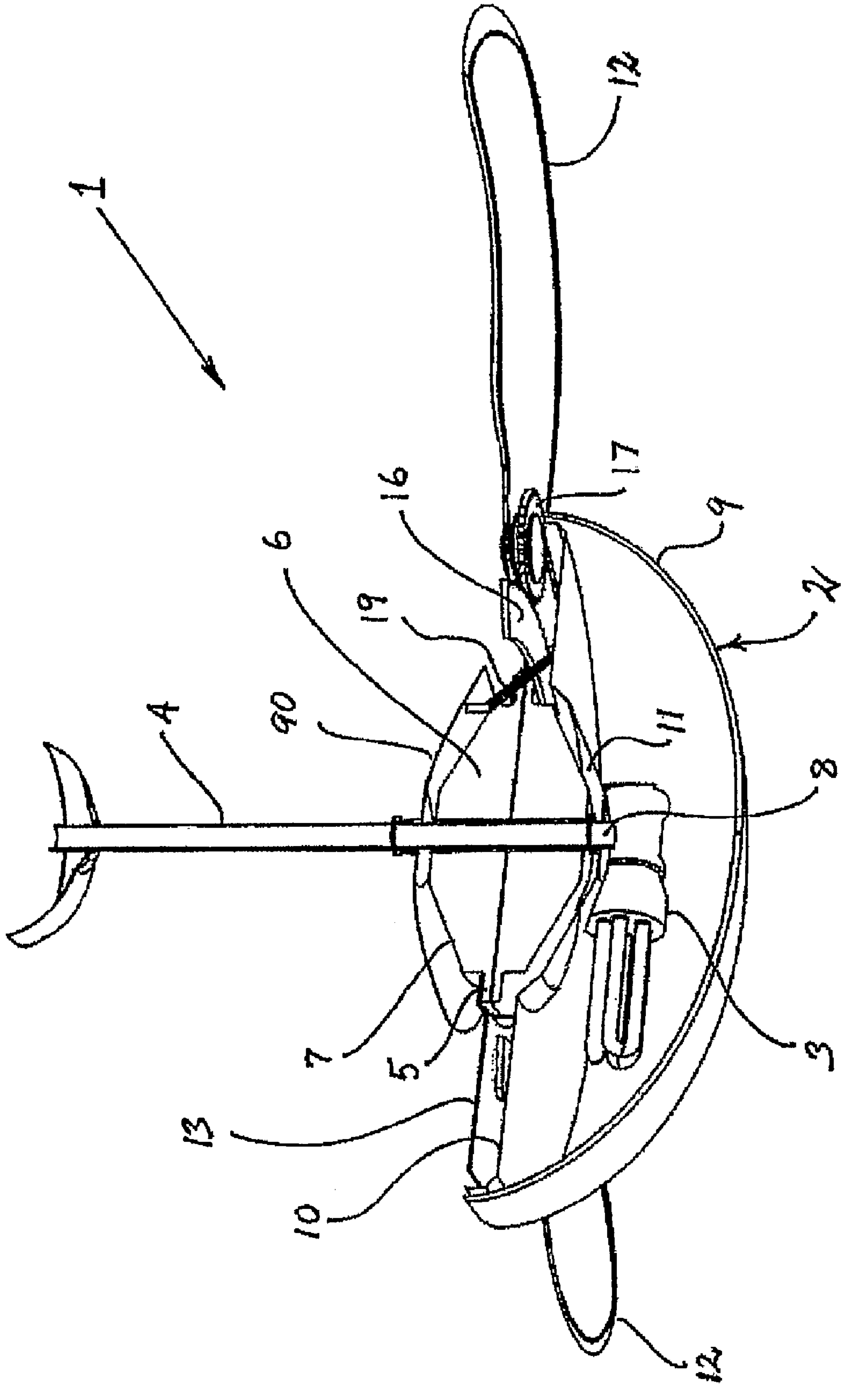
FIG. 3 is a perspective view of the combined ceiling fan and light fitting as shown in FIG. 1, partially cut away.
Figure 4:
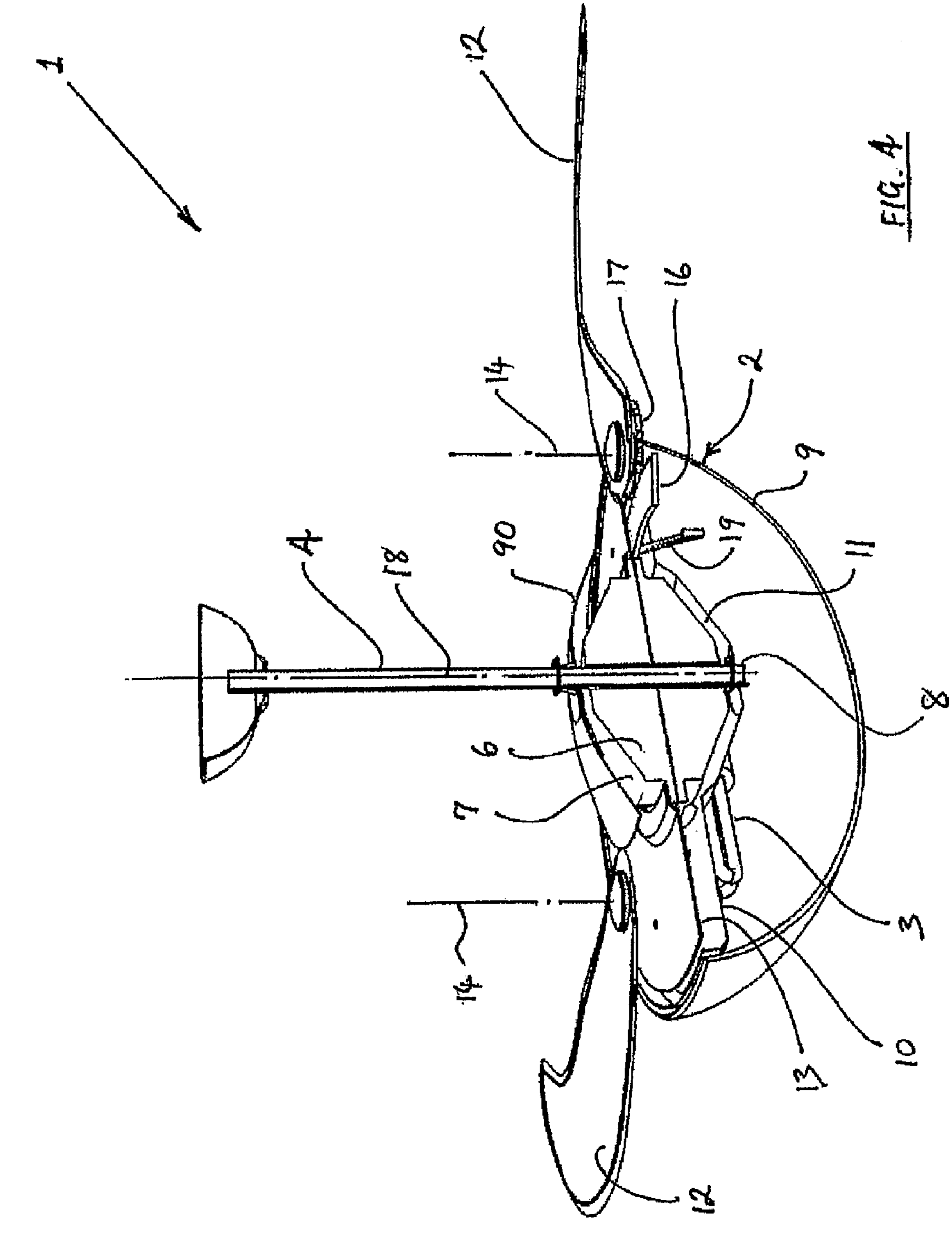
FIG. 4 is a further perspective view of the combined ceiling fan and light fitting as shown in FIG. 1, partially cut away.

Fan/light 1 has blades 12 that each extend outwardly when the motor 6 is switched on and that retract into positions shown in FIG. 2 when motor 6 is switched off. Blades 12 are pivotally supported on a blade support 13 that rotates with blades 12, is disc-shaped, is coaxial with the rotation axis 18 of motor 6 and is secured to a peripheral flange 5 of motor casing 7. (When removed from motor casing 7, blade support 13 would be seen to have a central hole (not shown) to permit this way of mounting.)

Figure 5:
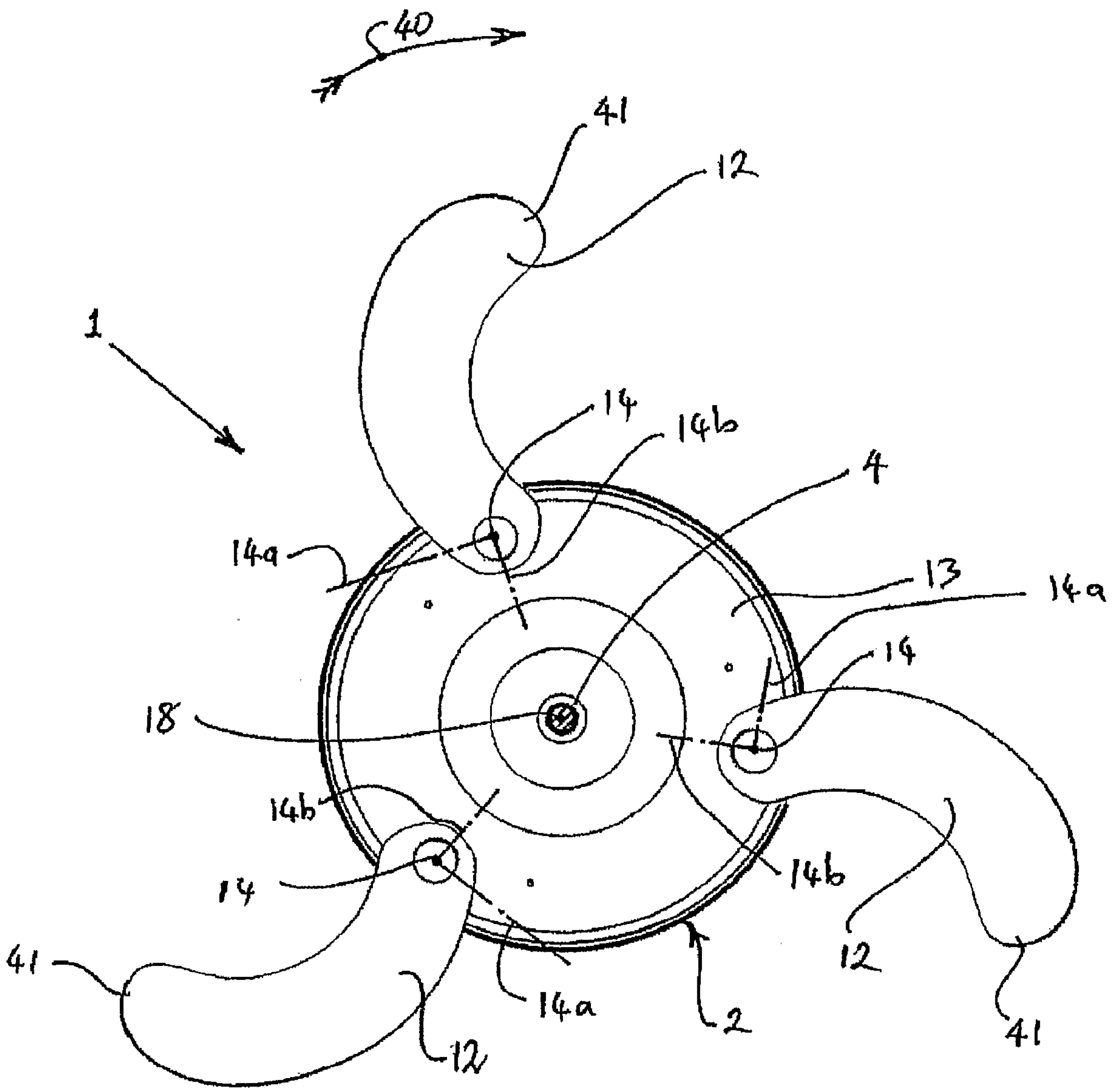
FIG. 5 is a plan view of the combined ceiling fan and light fitting as shown in FIG. 1, with its folding blades in working positions.
Figure 6:
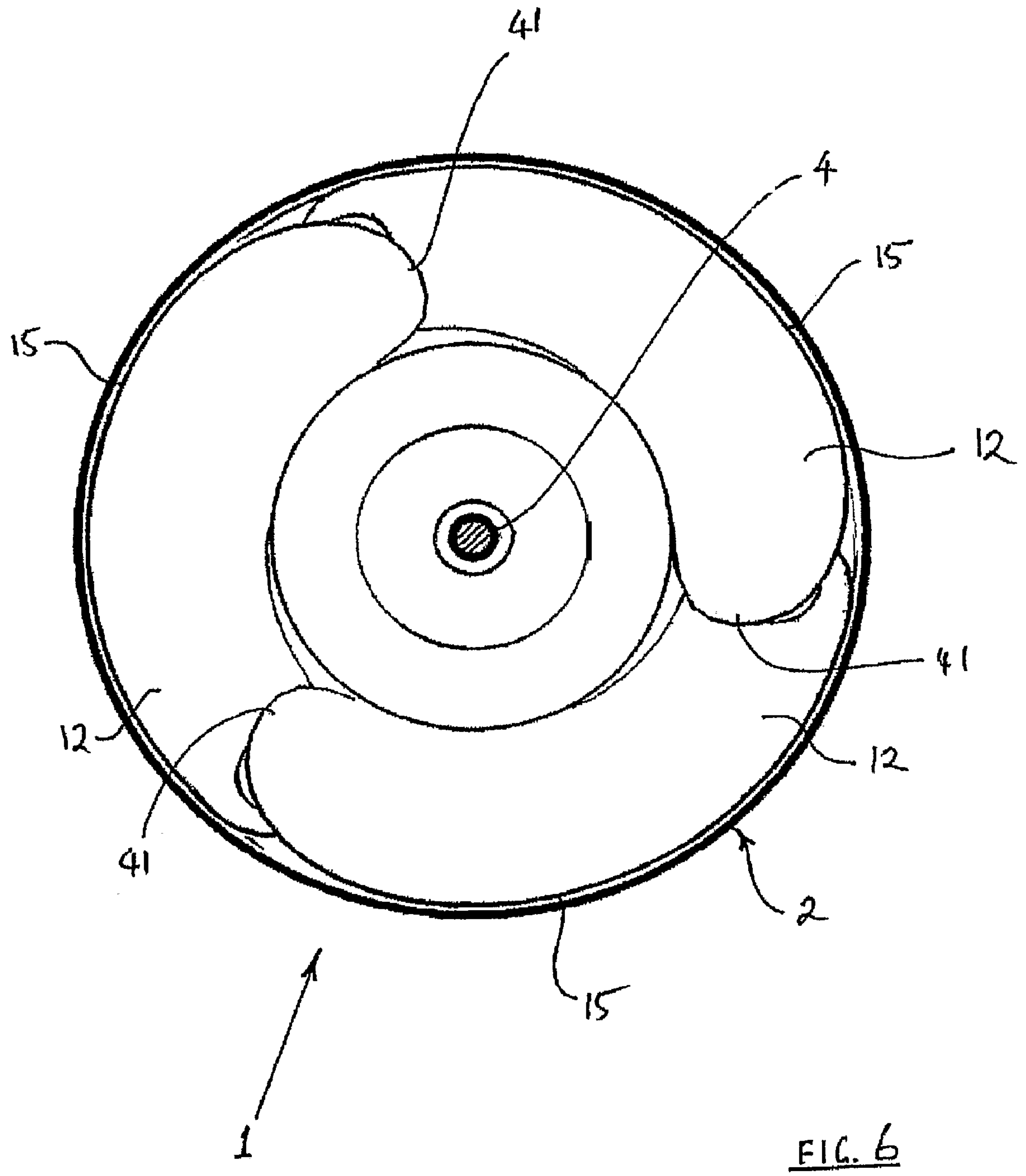
FIG. 6 is a plan view of the combined ceiling fan and light fitting shown in FIG. 2, now with its folding blades in stored positions.

Pivoting of blades 12 on blade support 13 is about axes 14 that are, in the embodiment shown in FIGS. 1 and 2, parallel to the axes of tubular support 4 and the motor 6. When motor 6 is switched on, blades 12 are urged outwardly by centrifugal force, pivoting around their respective pivot axes 14, until the working positions shown in FIGS. 1 and 5 are reached. In a manner set out below, blades 12 rotate around pivot axes 14 and are retracted to their stored positions as shown in FIGS. 2 and 6, when motor 6 is switched off.

Blades 12 are scimitar-shaped in plan view, and in the stored position, slightly overlap each other, and have curved edges 15 lying adjacent to and inside the periphery of light enclosure 2. It will be noted from FIG. 2 that in their stored positions blades 12 lie close to the top of enclosure 2. Thus, fan/light 2, when its fan function is not in use (motor off), prevents much of blades 12 from being visible to an observer below. Although there is nothing to stop blades being used that when retracted extend beyond the periphery of enclosure 2 so as to be only partly concealed, the preferred arrangement aesthetically is for the blades when folded to lie within the periphery of the enclosure 2.

It is important for balance of the fan/light 1 that the blades 12, which are circumferentially equispaced around blade support 13, take up substantially identical positions when extended and move in synchronized manner between their working and stored positions. The way in which this is done will now be described. Secured to blade support 13 on its underside is a sun gear 16. (The term "sun gear" is here used as it is in the art of so-called planetary gearing systems, where it refers to a gear that meshes with a number of "planetary" gears arrayed around its periphery.) Sun gear 16 is coaxial with the motor 6 when support 13 is mounted thereon, and is able to rotate about its axis relative to blade support 13. Meshing with sun gear 16 are planetary gears 17, each of which rotates with one of the blades 12 as that blade pivots about its pivot axis 14. Each gear 17 is secured to a short shaft 39 that passes downwardly from a blade 12 and can rotate within blade support 13 in a suitable sleeve (not visible). The axes 14 and therefore planetary gears 17 are at equal radii from the axis 18 of motor 6 and blade support 13. The effect of this arrangement is that provided blades 12 are identical and identically positioned in their working positions relative to blade support 13, they will be kept synchronized always when they move in and out.

To retract blades 12 when motor 6 is switched off, coil springs 19 are provided. One end of each spring is secured to a peg 22 depending from a lower surface 20 of blade support 13 and the other end is secured to a peg 23 depending from lower surface 21 of sun gear 16. Coil springs 19 are arranged to be in tension when blades 12 are in their retracted position and are extended as centrifugal force urges blades 12 out when motor 6 is started. When motor 6 is stopped, springs 19 urge sun gear 16 to rotate so as to retract the blades. Many other suitable arrangements and types of springs could be used and will suggest themselves to persons skilled in the art.

Depending on the sizes of gears 16 and 17, full rotation of gear 16 relative to blade support means 13 may not be necessary. At least one of blades 12 or, sun gear 16, is provided with suitable stops (not shown) that prevent movement of blades 12 outward beyond their working positions or inward beyond a chosen retracted position. For example, a suitable stop could comprise one or more pegs depending from blade support means 13 and received in a slot or slots in gear 16, so that contact between the peg and an end of the slot prevents further rotation of gear 16.

FIG. 10 shows a slot 70 formed in the gear 16. A stop 72 projects downwardly from the blade support means 13 and is received within the slot 70. In the illustrated arrangement, there is a single peg and slot but in practice it would be preferred to have a number of these equispaced about the rotational axis of the gear 16.

Figure 7:
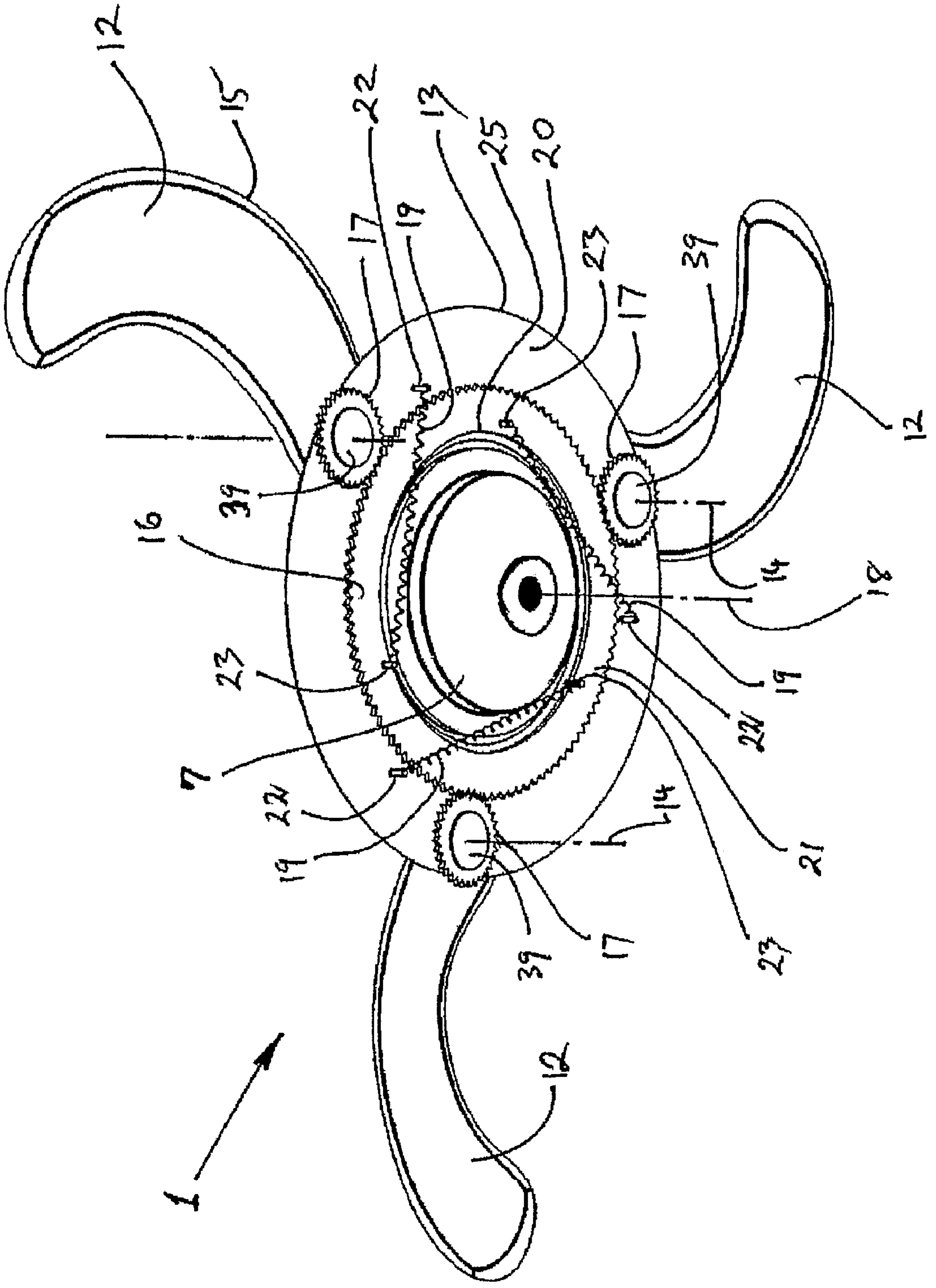
FIG. 7 is a perspective view of blades and a blade support means of the combined ceiling fan and light fitting as shown in FIG. 2, with the blades in their working positions.

Sun gear 16 is generally in the form of a centerless ring, and is rotatably mounted below lower surface 20 of blade support 13. As shown in FIG. 7, a retaining ring 25 having an upwardly facing shoulder (not visible) is secured to and depends from surface 20 of blade support 13 with gear 16 being captive between the shoulder and surface 20. Ring 25 centers gear 16 as well as holding it captive against blade support means 13.

The blade synchronization arrangement described above has several advantages, when compared with for example the mechanism shown in U.S. Pat. No. 2,079,942. First, it is simpler to assemble and can have a lower parts count. Second, if the gears 16 and 17 are made and positioned sufficiently accurately, there need be little freeplay in the mechanism, which leads to smoother and better-synchronized operation. Gears 16 and 17 lend themselves to accurate manufacture in suitable plastics (e.g. Nylon plastics) although there is no intention here to limit the scope of the invention to such materials. Third, gears 16 and 17 are concealed, as they lie below the blade support 13 and so are less likely to gather dust.

Where operation of the fan in both directions is not required, it is preferred that the direction of rotation be as shown by the arrow 40 in the Figures. This direction has the advantage that aerodynamic drag tends to assist centrifugal force in extending the blades 12.

It is preferred that the tips 41 of blades 12, when blades 12 are extended to their working position, be approximately as far radially outward from motor axis 18 as possible to take advantage of the greater airspeed at that point generated by rotation of the blades 12.

Particularly where the blades 12 when folded are to lie wholly within the periphery of enclosure 2, it is much less easy to provide blades 12 with a form having high aerodynamic performance by comparison with a conventional ceiling fan having non-retractable blades. Further, the blades will in most practical designs be smaller in area and length than would the case in a fixed-blade fan. Although only three blades 12 are shown in the diagrams, it is possible to alleviate this problem by providing more blades than three, and this is within the scope of the invention. For example, four blades could be used. The synchronization mechanism described above lends itself readily to synchronizing of a larger number of blades.

A number of approaches can be followed in designing the blades 12 to enhance their air-moving performance and/or improve the energy efficiency of the fan/light 1. These include:

(a) giving the blades 12 an angle of incidence to the horizontal;
(b) twisting the blades 12 to vary their angle of incidence along the blade length;
(c) choosing a cambered cross-section for the blades 12;
(d) providing a form of "dihedral", wherein the blade tips are at a different height from the blade roots when blades 12 are in their extended positions;
(e) providing blades of a shape and/or size in plan view to enhance aerodynamic forces and their distribution.

The requirement to at least partially conceal the blades when in their retracted position places limitations on the way and the degree to which these approaches can be followed. It is desirable for the blades 12 in their folded positions to lie close to the blade support 13 so as to give the best level of concealment of blades 12.

It is preferred to use blades that are not simply flat or made from flat plate, although there is no intention to preclude such blades from the scope of the invention. Blades may be made for example by moulding in suitable plastics, which allows for the relatively complex (e.g. cambered) shapes desirable for good aerodynamic performance.

Blades 12 of fan/light 1 are shaped to have cross-sections (shown in FIG. 2 by chain-dotted lines 50) with both incidence to the horizontal and camber. The incidence is such that the smaller-radius edges 51 of blades 12 are higher than the larger-radius edges 15. This is found to be advantageous also for compact folding of blades 12. The camber shown by lines 50 is such that the blades are concave downward and is preferred where the direction of rotation is as shown by arrow 40.

The angle of incidence of the blades 12 may be varied along their length, although this is not essential. The angle of incidence of blades 12 to the horizontal may be less at the tips. This feature also is not essential but may have energy-efficiency advantages and can assist in arriving at a design where in the blades-folded position the tip of one blade overlaps the root of an adjacent blade.

In U.S. Pat. No. 2,079,942, Le Velle discloses the idea of slanting backward the axis about which his blades rotate, to allow the blades to overlap in their folded positions. This approach also has the effect of placing each blade at an angle of incidence to the horizontal, and without this there would in fact be little or no vertical movement of air, due to the use of simple flat plate blades.

In the fan/light 1 of the present invention, the pivot axes 14 of blades 12 can be parallel to axis 18 of the motor 6, with the blades being adapted to move air by virtue of camber and/or a built-in angle of incidence to the horizontal. This is the case in fan/light 1 as shown in FIGS. 1 to 7. In FIG. 5, axes 14 appear as points for this reason. However, this is not to preclude the blade pivot axes 14 being slanted backwards or forwards to obtain a desired distribution along the blades 12 of angle of angle of incidence to the horizontal in operation. The sun gear 16 and planet gears 17 can be designed for operation with non-parallel axes of rotation by means well known in the gearing art. (For forward or backward slanting, helical teeth would be used on gears 16 and 17.) In FIG. 5 dotted lines 14*a* are added to show exactly what is meant here by backward slanting of the pivot axes 14. Lines 14*a* represent parts of the blade pivot axes 14 above the blades themselves as they would appear if slanted backwards, as required in general to increase angle of incidence. This assumes the direction of rotation to be as shown by arrow 40.

It has also been found, surprisingly, that advantage can be obtained by optionally canting axes 14 in a radial plane either alone or in combination with forward or backward slanting. In FIG. 5, lines 14*b* are added to show what is meant here by canting the pivot axes 14 inward. Radially disposed lines 14*b* represent parts of the blade pivot axes 14 above the blades themselves as they would appear if canted inward, (Such canting, on its own, can be accommodated by making the gears 16 and 17 bevel gears.) In U.S. Pat. No. 6,719,533, which relates to a fixed blade ceiling fan, it is disclosed that blade "dihedral", here meaning that the blade tips are at a higher elevation than the blade roots, can lead to a better distribution of air movement in the area below the fan (more specifically a reduction in the tendency to concentrate movement of the air to the area directly below a fan). If axes 14 are parallel to axis 18, blades with such dihedral do not in their folded positions lie compactly close to blade support 13 (if the latter is flat). However, blades such as blades 12, if permitted to rotate about axes 14 that are slightly inwardly canted, can be made to lie close to a flat blade support 13 when folded, and when unfolded to exhibit dihedral of the type mentioned above. This is illustrated in the schematic views of FIG. 8, which show in plan (a) and elevation (b) a fan/light 31 comparable to fanlight 1, although with only one blade 33 shown for clarity. Blade 33 is shown in both folded and extended positions, marked 33*a* and 33*b* respectively. Fan/light 31 has a fan motor axis 32, and blade 33 pivots about an axis 34 that is slightly canted inward. Blade 33 is scimitar shaped, and lies when folded within the periphery of a circular lamp enclosure 35. Blade 33 is a flat plate, and is shown edgewise at 33*a* in FIG. 8(*b*). In this folded condition blade 33 is parallel to the horizontal plane 36 of the upper edge of enclosure 35. However, when blade 33 is extended to its working position (by rotating through 140 degrees about axis 34 in the particular example shown), it is found that blade 33 has dihedral, with its tip 37 higher than its root end 38. The angle of the blade 33 to the horizontal as seen in the elevation of FIG. 8(*b*) increases progressively from root end 38 to tip 37. Furthermore, assuming the direction of rotation to be as shown by arrow 39, it is found that leading edge 45 of blade 33 is higher than trailing edge 46. That is, blade 33 can be a flat and horizontal plate when folded, yet have both a positive angle of incidence to the horizontal and dihedral.

In practice, it is preferred to use a blade shape with camber and that has a positive angle of incidence to the horizontal even when in the folded position to obtain a larger air moving effect than is possible from a flat plate blade such as blade 33. However, the example of a flat plate shown in FIG. 8 shows that by inward canting of the blade pivot axis 34, a blade can be designed that folds more compactly than would be the case if pivot axis 34 were vertical.

It is emphasized that either or both of backwards/forwards and radial sloping of the pivot axes may be found suitable for a given blade shape, and that in practice camber, incidence to the horizontal even when folded, and blade twist may be applied in addition to such sloping of the pivot axes.

FIG. 9 is similar to FIG. 8(*a*) and shows yet another option for enhancing air movement. FIG. 9 shows one blade 60 only for simplicity (although in practice multiple blades would be used), on a fan/light 61 similar to fan/light 31. Blade 60 (shown in retracted position as 60*a* and extended position as 60*b*) does not have substantially parallel arcuate leading and trailing edges like those 45 and 46 of blade 33. Instead the edge 62 that lies closer to support 63 when folded comes closer to support 63 when folded so that the area of blade 60 is greater in plan view than the area of the otherwise comparable blade 33. The width of blade 63, between its root end 64 and tip end 65, first increases to a maximum and thereafter decreases to curved tip 65. This type of plan form can be used where the motor casing (not shown) is positioned (e.g. within lamp enclosure 66) to provide more room for the blades when folded above enclosure 66 than in the case, for example, of fan/light 1, (In that case casing 7 limits the available plan shape and area of blades 12. Of course, a blade such as blade 60 may be provided with camber and an angle of incidence to the horizontal, and may also have a pivot axis that is not parallel to its fan axis, in the same way as the other blades described above.

It will be readily apparent to persons skilled in the relevant arts that many variations can be made to the embodiments described above without exceeding the spirit or scope of the present invention.

In this specification, including in the appended claims, the word "comprise" (and derivatives such as "comprising", "comprises" and "comprised") when used in relation to a set of integers, elements or steps is not to be taken as precluding the possibility that other integers elements or steps are present or able to be included.

The particular shape of the translucent lower section 9 of enclosure 2 is by no means the only possible one. Even a shape that is not of the circular shape in plan, as shown in the FIGS. 1 to 7 could be used as an alternative aesthetic choice.

The invention claimed is:

1. A combined ceiling fan and light fitting having folding fan blades comprising:

a motor having a shaft and casing which is mounted for rotation about a fan rotation axis;

mounting means for fixing an end of the shaft;

a blade support coupled to the casing of the motor for rotation therewith about said fan rotation axis;

a plurality of blades pivotally mounted on the blade support rotation about blade pivot axes between retracted and extended positions;

biasing means for biasing the blades into their retracted positions;

wherein the arrangement being such that, on operation of the motor, the casing rotates which causes rotation of the blades about said fan rotation axis and, due to centrifugal forces, about their respective blade pivot axes into their extended positions and, on de-activation of the motor, to return to their retracted positions by the action of the biasing means characterised in that the fitting includes synchronising means, said synchronising means includes a body which is mounted for limited rotation about said fan rotation axis relative to the blade support means and wherein the body carries first gear teeth which mesh with second teeth coupled to respective blades whereby the blades are constrained to rotate in synchronism about their respective blade pivot axes; and wherein the body includes a slot or slots and the blade support includes one or more pegs which are received in the slots whereby said limited rotational movement is defined by contact between the peg or pegs and the ends of the slots.

2. A combined ceiling fan and light fitting according to claim 1 wherein in their retracted positions the blades lie when seen from above substantially within a peripheral boundary of the said blade support.

3. A combined ceiling fan and light fitting according to claim 1 wherein the fan blades are cambered along their lengths.

4. A combined ceiling fan and light fitting according to claim 1 wherein the blades are formed to have a variable angle of incidence to the horizontal when in their operative positions.

5. A combined ceiling fan and light fitting according to claim 1 wherein said blades have tips and said tips in their operative positions rotate in a plane closer to a ceiling from which the combined ceiling fan and light fitting is suspended than root ends of said blades.

6. A combined ceiling fan and light fitting according to claim 1 wherein the pivot axes of the blades are oriented other than parallel to the rotation axis of the electric motor.

7. A combined ceiling fan and light fitting according to claim 6 wherein the pivot axes are closer to the motor rotation axis immediately above the blades than immediately below the blades.

8. A combined ceiling fan and light fitting according to claim 1 wherein each of the blades each has a tip, root end, leading edge and trailing edge, the blade pivot axis being parallel to or canted relative to the fan rotation axis, and wherein, in cross-section through the blades in their folded positions at a radial plane which includes the fan rotation axis, the cross-sectional shape of each blade is defined by upper and lower edges wherein the upper edge includes a convex portion and the lower edge includes a concave portion; and, wherein the tips of said blades are, in use, higher than root ends of said blades.

9. A combined ceiling fan and light fitting according to claim 8 wherein the pivot axes of the blades are oriented other than parallel to the rotation axis of the electric motor.

10. A combined ceiling fan and light fitting as claimed in claim 1 wherein the body is a ring.

11. A combined ceiling fan and light fitting as claimed in claim 10 wherein the ring and first gear teeth comprise a sun gear and the second teeth are on respective planet gears.

12. A combined ceiling fan and light fitting as claimed in claim 1 wherein the blade support is disc shaped and the body, first teeth, second teeth and biasing means are located beneath the blade support means.

13. A combined ceiling fan and light fitting as claimed in claim 1 wherein the biasing means includes springs which act between the blade support and said body.

* * * * *

UNITED STATES PATENT AND TRADEMARK OFFICE

CERTIFICATE OF CORRECTION

PATENT NO. : 8,317,470 B2
APPLICATION NO. : 11/995585
DATED : November 27, 2012
INVENTOR(S) : Joe Villella It is certified that error appears in the above-identified patent and that said Letters Patent is hereby corrected as shown below:

Column 9, Lines 9-10, Claim 1:

After “the blade support”
Insert -- for --.

Signed and Sealed this
Twenty-sixth Day of March, 2013

Teresa Stanek Rea
*Acting Director of the United States Patent and Trademark Office*